United States Patent [19]

McCauley

[11] Patent Number: 5,000,152
[45] Date of Patent: Mar. 19, 1991

[54] FUEL CONSERVATION MEANS FOR INTERNAL COMBUSTION ENGINES

[76] Inventor: Roger A. McCauley, 3287 S. Cincinnati, Apt. 488, Tulsa, Okla. 74105

[21] Appl. No.: 511,232

[22] Filed: Apr. 19, 1990

[51] Int. Cl.$^5$ .............................. F02M 33/00
[52] U.S. Cl. ...................... 123/536; 123/549
[58] Field of Search ............ 123/536, 537, 538, 543, 123/547, 549

[56] References Cited

U.S. PATENT DOCUMENTS

| | | | |
|---|---|---|---|
| 4,005,683 | 2/1977 | Whitt | 123/536 |
| 4,338,905 | 7/1982 | Urich | 123/536 |
| 4,524,746 | 6/1985 | Hansen | 123/538 |
| 4,590,915 | 5/1986 | Yamauchi et al. | 123/538 |

Primary Examiner—Andrew M. Dolinar
Assistant Examiner—M. Macy
Attorney, Agent, or Firm—Robert B. Stevenson

[57] ABSTRACT

A fuel conservation device free of moving parts and adapted to be interposed between the carburetor and intake manifold of an internal combustion engine. The device comprises three components or stages: a static vortex generator, an ultrasonic transducer and an electric current carrying wire grid or screen. The static vortex generator creates physical mixing of the air and fuel mixture as well as centrifugally impinging the air and fuel mixture against the ultrasonic transducer(s) for further atomization. Passing through the heated grid promotes thermal vaporization as well as magnetic field perturbation on a molecular level. The resulting increased dispersion and atomization of the fuel into the air improves engine performance including fuel economy and ease of starting.

2 Claims, 1 Drawing Sheet

FUEL CONSERVATION MEANS FOR INTERNAL COMBUSTION ENGINES

BACKGROUND OF THE INVENTION

1. Field of the Invention:

This invention relates to an improved fuel conservation means adapted to be interposed between a carburetor and an intake manifold of an internal combustion engine or the like. More specifically, the invention relates to a devise that is substantially free of moving parts and does not substantially restrict flow yet combines physical mixing, ultrasonic vibration, thermal heating and magnetic field perturbation to achieve improved fuel in air atomization.

2. Description of the Prior Art:

The basic concept of promoting atomization of liquid fuel droplets dispersed in air prior to combustion in the internal combustion engine has long been recognized as a problem relative to fuel economy, ease of starting and general performance particularly in regard to the conventional air aspirated carburetor engine. Historically various types of devices and methods have been suggested and proposed to assist in dispersing and/or vaporizing liquid hydrocarbon droplets in the fuel and air mixture within the intake manifold of a conventional internal combustion engine with varying degrees of commercial success. Notable with respect to improving fuel conservation, U.S. Pat. Nos. 3,952,716 and 4,059,082 disclose devices that employ three components or stages for treating fuel and air mixtures from a carburetor prior to entering the intake manifold of an internal combustion engine. These stages involve the use of a rotor to produce physical mixing and to drive a second rotor that produces sonic vibration followed by an electrically heated grid or screen to promote vaporization. The major difficulty with these prior art devices is that they contain moving parts which ultimately result in lubrication and wear problems. The present invention is viewed as an improvement of these devices.

SUMMARY OF THE INVENTION

The present invention provides an improved device which is particularly designed and constructed for conserving fuel during the operation of an internal combustion engine. The novel device is adapted to be interposed between the discharge or outlet side of a carburetor or injectors and the inlet or intake side of a manifold for receiving the fuel and air mixture stream therethrough. The device is characterized and distinguished from prior art devices in that there are essentially no moving parts and virtually no restriction in the flow; yet the fuel and air mixture passing through the device is treated by a three stage process including physical mixing, ultrasonic vibration, and heating/magnetic perturbation.

Thus, the present invention provides a fuel conservation device free of moving parts and adapted to be interposed between the carburetor and intake manifold of an internal combustion engine without substantially restricting flow comprising:

(a) a cylindrical housing with a circular cross-sectional opening of substantially uniform diameter passing therethrough having an intake side at one end and an outlet side at the other end;

(b) a static vortex generating means positioned within the cylindrical housing adjacent to the intake side for creating rotation of an air and fuel mixture flowing through the opening in the cylindrical housing wherein the static vortex generating means consists essentially of a plurality of sloped protruding blades extending radially inward from the inner wall of the cylindrical housing such that the average unobstructed cross-sectional area of the opening within the cylindrical housing is not substantially reduced and wherein the static vortex generating means is for directing an air and fuel mixture flowing through the opening in the cylindrical housing centrifugally across a plurality of ultrasonic transducers;

(c) at least one ultrasonic transducer wafer positioned adjacent to and immediately downstream from the static vortex generating means and operatively attached substantially flat to the inner wall of the cylindrical housing such as to optimize the surface area of the ultrasonic transducer wafer making contact with a centrifugally rotating air and fuel mixture flowing through the opening in the cylindrical housing; and (d) an electrical current grid means for heating and magnetically perturbing an air and fuel mixture flowing through the opening in the cylindrical housing wherein the electrical current grid means is positioned adjacent to and immediately downstream from the ultrasonic transducer wafer and wherein the electrical current grid means comprises at least one resistance heating wire adapted to carry an electrical current therethrough wherein the wire passes back and forth across the opening such that each successive pass of the wire back and forth is closely spaced and substantially parallel with an electric current flowing in the opposite direction to the current flowing in the wire immediately adjacent on either side.

It is an object of the present invention to provide an improved fuel conservation means for internal combustion engines that promotes fuel atomization and/or vaporization by the combination of physical mixing, ultrasonic vibration and heating/magnetic perturbation. It is a further object of the present invention to accomplish the above in a device that is free of moving parts and nonrestrictive with respect to flow. Fulfillment of these objects and the presence and fulfillment of additional objects will be apparent upon complete reading of the specifications and claims taken in conjunction with the attached drawings.

DESCRIPTION OF THE PREFERRED EMBODIMENTS

Figure 1:
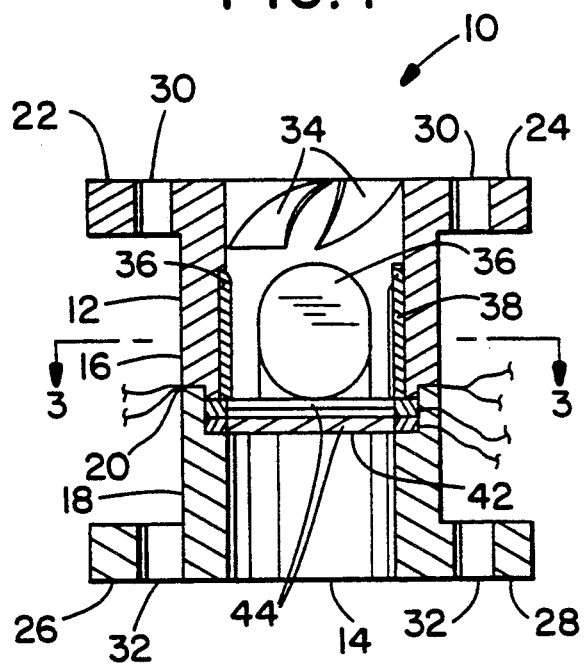
FIG. 1 is a partial cross-sectional side view of an improved fuel conservation device according to the present invention.

The improved fuel conservation device according to the present invention, how it functions, how it differs from the prior art devices and the advantages associated with its use can perhaps be best explained and understood by reference to the drawings. As illustrated in FIG. 1, the improved fuel conservation device, generally designated by the numeral 10, comprises a cylindrical housing 12 having a central passageway or opening 14 extending longitudinally therethrough. Whereas the cylindrical housing 12 may be of substantially any desired construction, the specific embodiment illustrated in FIG. 1 is sectional in construction for ease of assembly. As such, the housing 12 consists of an upper section 16 and a lower section 18 which engage along a circular staggered edge 20 essentially midway along the cylindrical housing 12. At the top and the bottom of housing 12 are pairs of oppositely disposed outwardly extending flanges 22 and 24 at the top of section 16, and 26 and 28 at the bottom of section 18. The flanges 22-24 and 26-28 are provided with bores 30 and 32, respectively, which can be aligned axially for the purpose of accepting a threaded bolt, stud or the like (not shown) such as to compressively hold the fuel conservation device together. It should be further appreciated that the flanges and bolt holes therethrough can also function to assemble and attach the device 10 between the carburetor and intake manifold.

Figure 6:
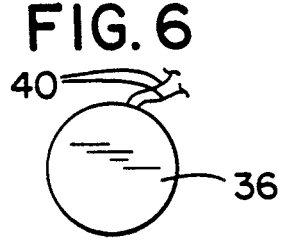
FIG. 6 is a plan view of an ultrasonic transducer wafer element useful in the present invention.
Figure 3:
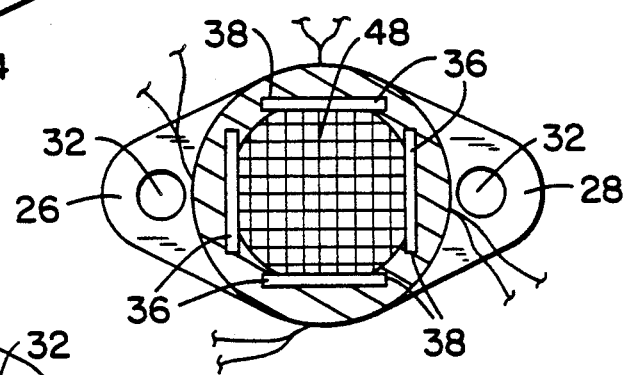
FIG. 3 is a cross-sectional view taken along line 3—3 of FIG. 1.
Figure 4:
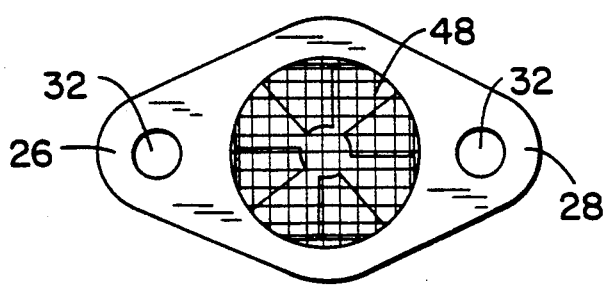
FIG. 4 is a bottom elevational view of the improved fuel conservation device of FIG. 1.

On the inner surface of the opening 14 at the top of the cylindrical housing 12 are a set of four sloped blades 34 that protrude radially inward. These sloped blades constitute a static vortex generator means for inducing a rotational motion in the fuel and air mixture passing through the device 10. Immediately below the series of sloped blades 34 are a set of four ultrasonic transducer wafers 36 (see FIG. 3) each positioned in a slot 38 that holds the transducer substantially flat against the inner wall of opening 14. As further seen in FIG. 3, the slot 38 is sized such as to accept a circular wafer 36 (see FIG. 6) which can be manually inserted in place by virtue of disassembling the cylindrical housing 12 along the engagement edge 20. This engagement edge 20 is further adapted to allow the respective electrical lead wires 40 of the wafers 36 to pass through the housing 12 (see FIG. 1). As the fuel and air mixture is swirled in a rotational motion by the static vortex generator means the more dense liquid droplets will centrifugally impinge on the ultrasonic transducer wafer and consequently be further dispersed and atomized. Immediately below the ultrasonic wafers 36 is an electrical current powered grid means 42.

Figure 5:
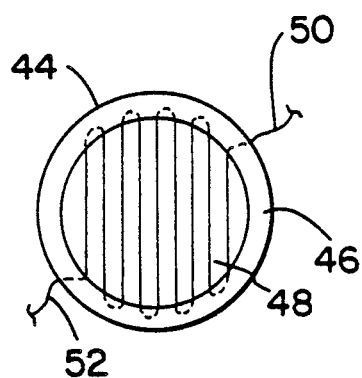
FIG. 5 is a plan view of a grid element useful in the present invention.
Figure 2:
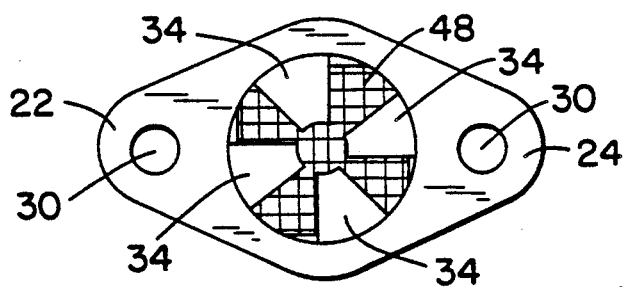
FIG. 2 is a top elevational view of the improved fuel conservation device of FIG. 1.

The grid means 42 preferably comprises a pair of substantially identical grid-type discs 44 (see FIG. 5) preferably spaced slightly apart. Each disc 44 is comprised of an annular outer ring 46 having a single strand of Ni-chrome heating wire 48 or the like of a suitable diametric size and following a back and forth pathway across the open central portion of the ring 46, with the loops or segments of the wire 48 at the turning points thereof being molded or otherwise secured to the ring 46.

The portion of the wire 48 spanning the open central portion of ring 46 is substantially parallel such that the electrical current flow in any given pass is opposite the direction of current flow in the adjacent parallel wire segments on either side. The opposite ends of the wire 48 extend beyond the outer periphery of the ring 46 as clearly shown in FIG. 5, with one end 50 emerging from one surface of the ring 46 and the opposite end 52 emerging from the opposite surface thereof. In the assembly of the grid means 42, one of the disc 44 is disposed in axial alignment with the other disc 44 such that the passes of the wire 48 of one disc are substantially perpendicularly disposed with respect to the passes of the wire 48 of the other disc. The ends of the wire 48 which emerge from the common sides or surfaces thereof, or the surfaces facing one another, are connected in any well known manner, and the connected ends and free ends are suitably connected with an electrical source (not shown), such as the electrical system of an automobile wherein the internal combustion engine (not shown) with which the device 10 is to be utilized is installed. Of course, it will be apparent that the opposite ends 50 and 52 of the adjacent discs 44 may be connected with the electrical source, and the common wires which are connected between the discs 44 will electrically connect the discs 44 in the circuit.

It is to be understood that the grid means 42 may be of an ultimate substantially unitary construction in that the rings 46 of the complementary discs 44 may be cemented or otherwise secured together subsequent to the forming of the wires 48 therein whereby in essence the outer rings 46 form a single annular ring (not shown) having a pair of mutually perpendicular arranged wire grid portion 48 in spaced relation in the center thereof.

The device 10 as shown in FIGS. 1-5 is particularly designed and constructed for use in combination with a single barrel carburetor (not shown) and may be installed between the discharge side of the carburetor and the intake manifold (not shown). The device is installed in such a way that the static vortex generator means is upstream from the electrical grid means relative to the direction of flow of the fuel/air mixture from the carburetor to the manifold. The carburetor and manifold function in the normal manner, and as the fuel/air mixture is pulled into the manifold from the carburetor, the flow stream moves across the vortex generator, inducing rotation therein. The induced rotation results in agitation and stirring but most importantly in centrifugal movement of the entrained droplets of fuel across the face of the plurality of ultrasonic transducers. The ultrasonic vibration energy imposed on the fuel/air mixture further atomizes and disperses the fuel.

The rotating stream then moves across the electrical grid means wherein the rotational motion inherently causes the air/fuel mixture to pass tangentially across more than one pass of the heating wire. More specifically, the hydrocarbon droplets will experience several reversals of the superimposed magnetic fields associated with the oppositely directed electrical current flows. It should be appreciated that this inherent reversal of magnetic direction (magnetic perturbation) is present independent of whether or not the electrical current is direct or alternating current. This magnetic perturbation in combination with the thermal heating of the resistive wire tends to further vaporize and homogenize the fuel/air mixture prior to combustion. Consequently, all of the known advantages associated with improved atomization and vaporization of the fuel/air mixture, and in particular the advantages disclosed in U.S. Pat. Nos. 3,952,716 and 4,059,082, are achieved efficiently, quickly, and inexpensively by use of the improved fuel conservation device according to the present invention. In addition, the above is achieved with a device that substantially involves no restriction in flow and no moving parts that will ultimately wear and fail.

The actual construction of the fuel conserving device according to the present invention can be out of any of the materials generally known and used in the art. As such, the cylindrical housing can be made out of any of the metal or hydrocarbon resistant plastics as generally used in the construction of carburetors/fuel systems. The vortex generator is preferably molded or cast in place at the time of manufacturing the housing, but, in principle, could be a separate part attached after the housing is manufactured. The electrical grid is preferably made from a single strand of Ni-chrome wire or the like and is to be imbedded into a nonconductive annular ring or the like. By way of example, but not limited thereto, this would include a ring made from certain thermoplastics and polyfluorocarbons, phenolics, certain polyamides and polyamideimides or polyphenylene sulfides and the like. It should be appreciated that the plurality of ultrasonic transducer wafers can be essentially any number of such devices as long as at least one transducer is present and is generally designed such that its profile is substantially oriented to expose the surface of the device to the rotating fuel/air mixture. Preferably an ultrasonic wafer such as manufactured by The Sunbean Corporation.

The electrical circuit associated with the electrical current grid means can be either a d.c. or a.c. circuit. Typically, it will involve a d.c. current from the battery of the engine either directly or through an appropriate chopping or oscillation circuit or an a.c. current directly from an alternator associated with the engine. Similarly, the electrical circuit associated with the ultrasonic transducer can be an appropriate oscillation circuit as generally know in the art.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

I claim:

1. A fuel conservation device free of moving parts and adapted to be interposed between the carburetor and intake manifold of an internal combustion engine without substantially restricting flow comprising:
   (a) a cylindrical housing with a circular cross-sectional opening of substantially uniform diameter passing therethrough having an intake side at one end and an outlet side at the other end;
   (b) a static vortex generating means positioned within said cylindrical housing adjacent to the intake side for creating rotation of an air and fuel mixture flowing through said opening in said cylindrical housing wherein said static vortex generating means consists essentially of a plurality of sloped protruding blades extending radially inward from the inner wall of said cylindrical housing such that the average unobstructed cross-sectional area of said opening within said cylindrical housing is not substantially reduced and wherein said static vortex generating means is for directing an air and fuel mixture flowing through said opening in said cylindrical housing centrifugally across a plurality of ultrasonic transducers;
   (c) at least one ultrasonic transducer wafer positioned adjacent to and immediately downstream from said static vortex generating means and operatively attached substantially flat to the inner wall of said cylindrical housing such as to optimize the surface area of said ultrasonic transducer wafer making contact with a centrifugally rotating air and fuel mixture flowing through said opening in said cylindrical housing; and
   (d) an electrical current grid means for heating and magnetically perturbing an air and fuel mixture flowing through said opening in said cylindrical housing wherein said electrical current grid means is positioned adjacent to and immediately downstream from said ultrasonic transducer wafer and wherein said electrical current grid means comprises at least one resistance heating wire adapted to carry an electrical current therethrough wherein said wire passes back and forth across said opening such that each successive pass of said wire back and forth is closely spaced and substantially parallel with an electric current flowing in the opposite direction to the current flowing in the wire immediately adjacent on either side.

2. A fuel conservation device of claim 1 wherein said electric current grid means comprises a single resistance heating wire wherein after passing back and forth across said opening for a first time passes back and forth across said opening for a second time immediately adjacent to but not touching the first series of back and forth passes and wherein the second back and forth series of passes is essentially perpendicular to the first series of back and forth passes and substantially parallel with an electric current flowing in the opposite direction to the current flowing in the wire immediately adjacent on either side.

* * * * *